Oct. 23, 1962     C. D. GRABER ET AL     3,059,840
DEAL DRAWER CONSTRUCTION FOR BANK DRIVE-UP WINDOW
Filed March 21, 1961     9 Sheets-Sheet 1

INVENTORS
Carl D. Graber
Thomas H. Kenny
Leo J. Grosswiller
BY Frease, Bishop, Johns & Schick
ATTORNEYS

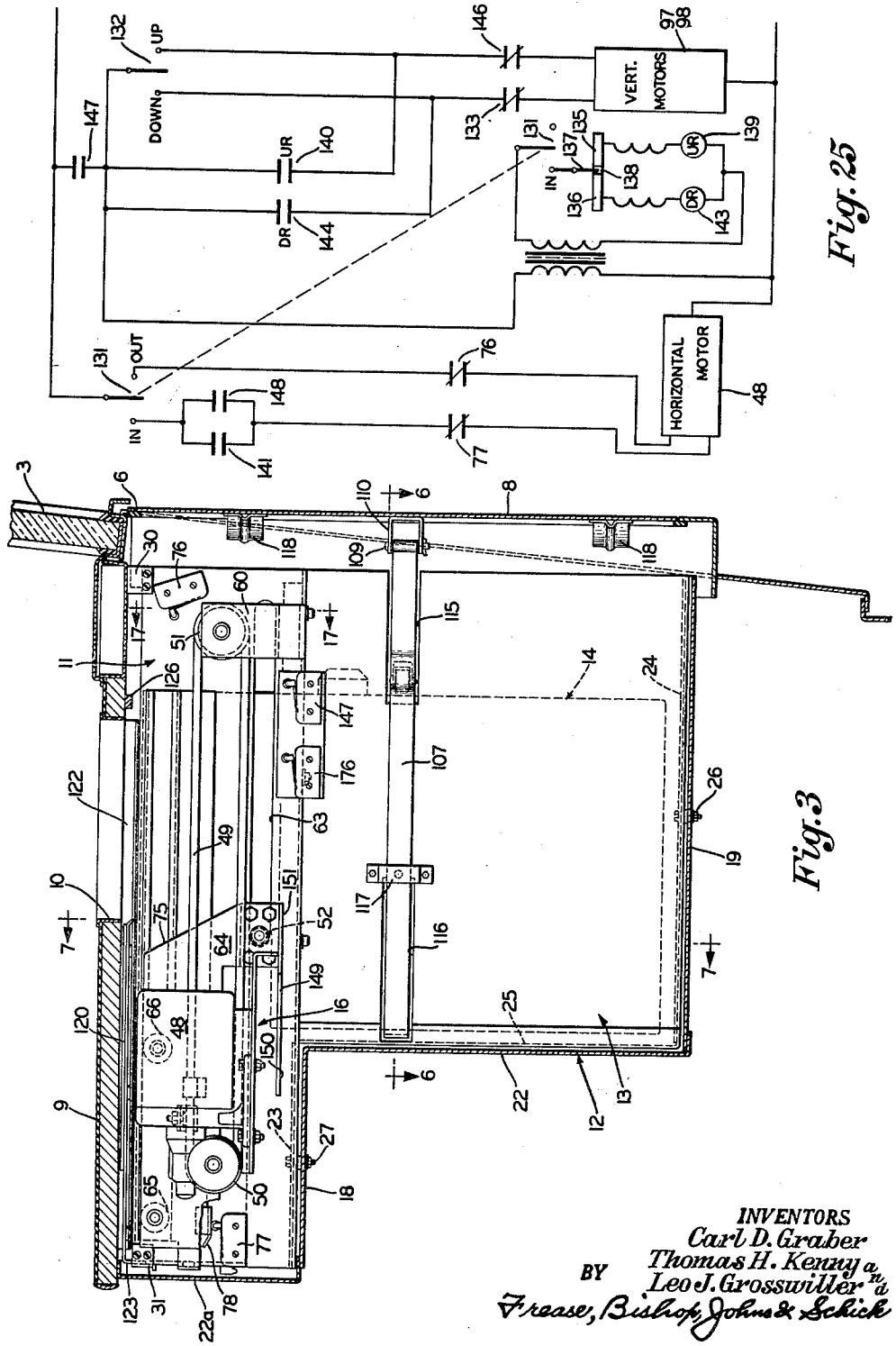

INVENTORS
Carl D. Graber
Thomas H. Kenny
Leo J. Grosswiller
BY
Fraase, Bishop, Johns & Schick
ATTORNEYS Oct. 23, 1962　　　C. D. GRABER ET AL　　　3,059,840
DEAL DRAWER CONSTRUCTION FOR BANK DRIVE-UP WINDOW
Filed March 21, 1961　　　　　　　　　　　9 Sheets-Sheet 4
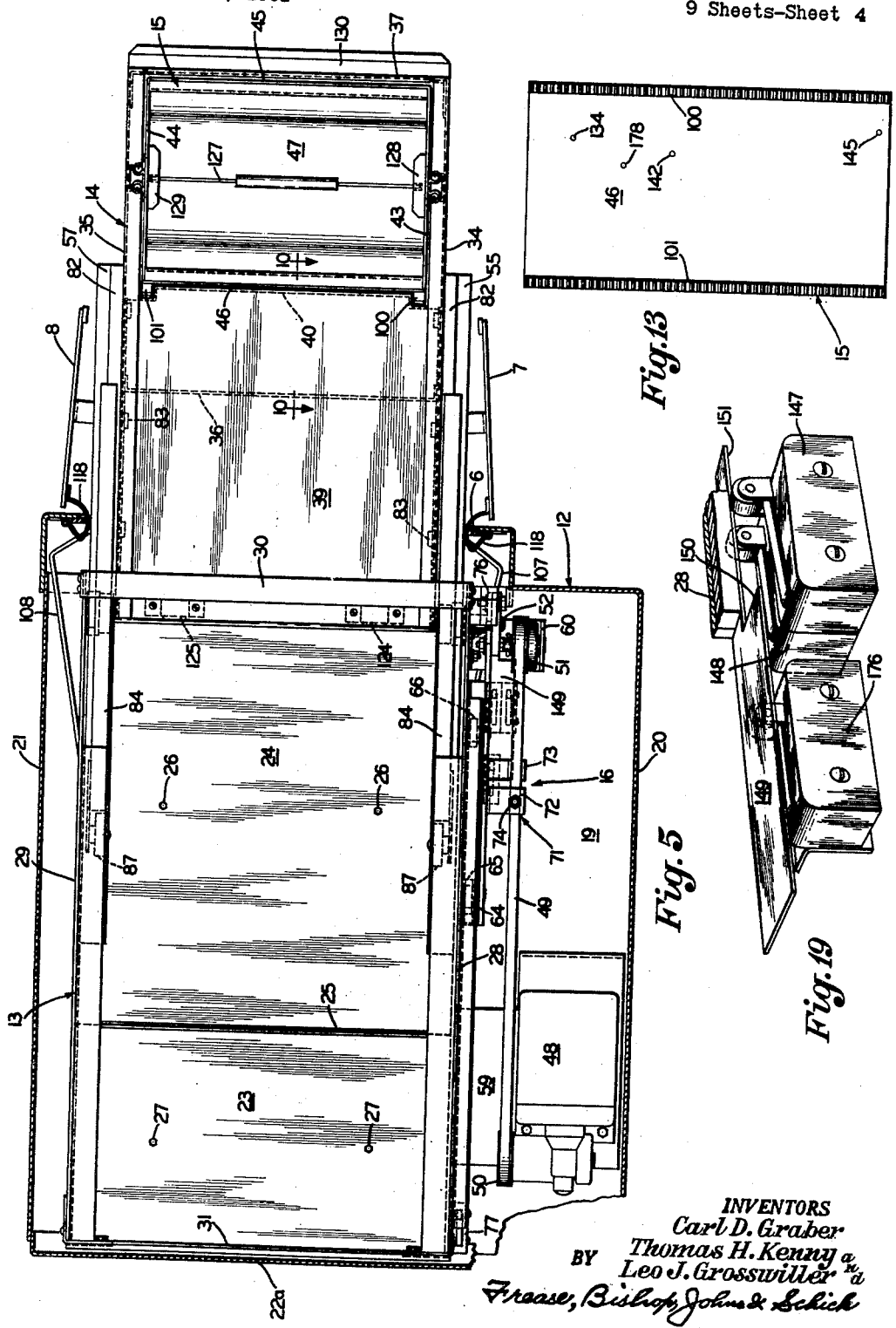
INVENTORS
Carl D. Graber
Thomas H. Kenny
BY Leo J. Grosswiller
Frease, Bishop, Johns & Schick
ATTORNEYS Oct. 23, 1962 C. D. GRABER ET AL 3,059,840
DEAL DRAWER CONSTRUCTION FOR BANK DRIVE-UP WINDOW
Filed March 21, 1961 9 Sheets-Sheet 5
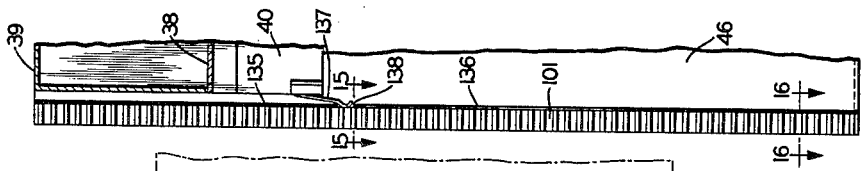
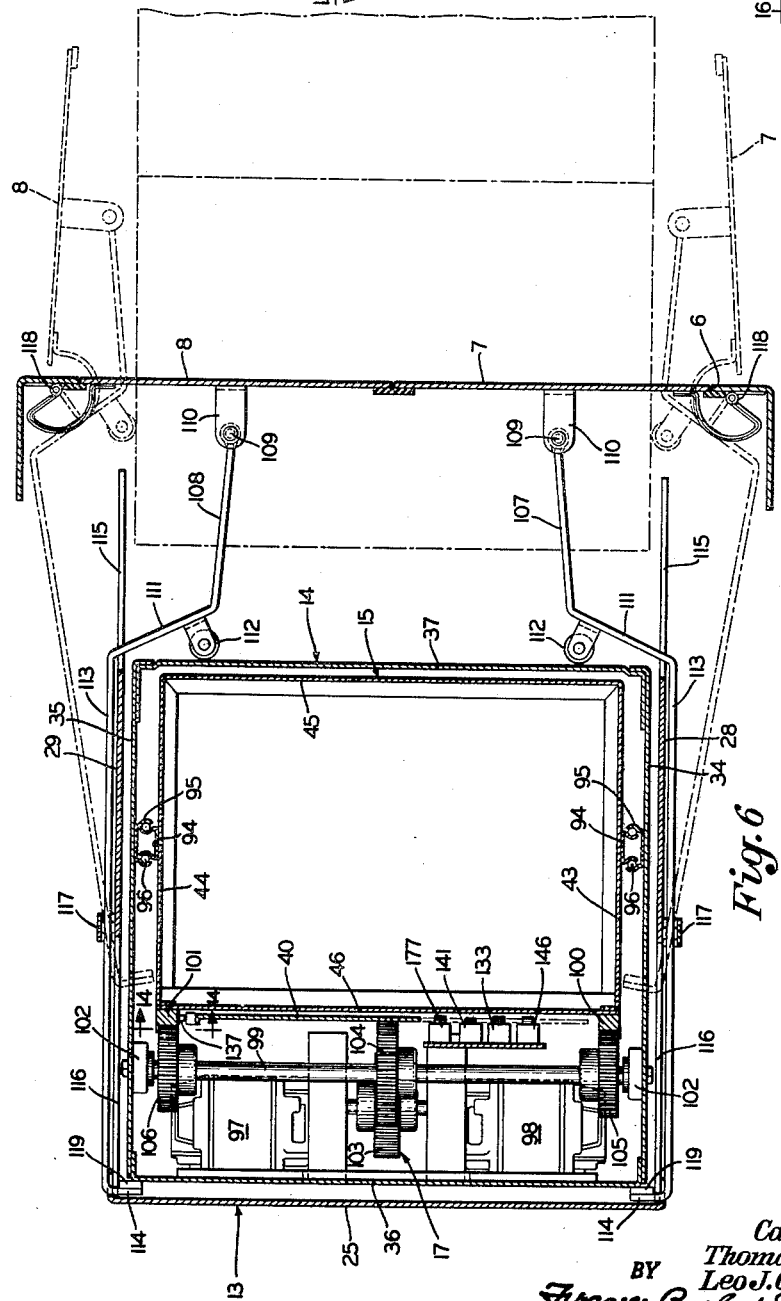
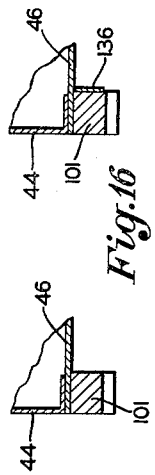
INVENTORS
Carl D. Graber
Thomas H. Kenny and
Leo J. Grosswiller
BY Frease, Bishop, Johns & Schick
ATTORNEYS Oct. 23, 1962  C. D. GRABER ET AL  3,059,840
DEAL DRAWER CONSTRUCTION FOR BANK DRIVE-UP WINDOW
Filed March 21, 1961  9 Sheets-Sheet 6

INVENTORS
Carl D. Graber
Thomas H. Kenny
Leo J. Grosswiller
BY Frease, Bishop, Johns & Schick
ATTORNEYS

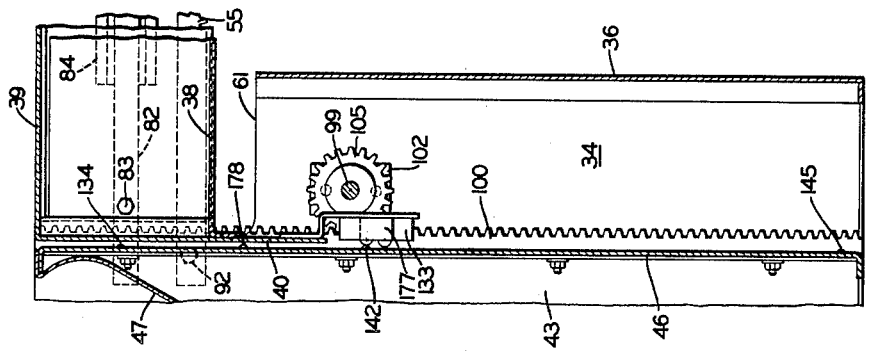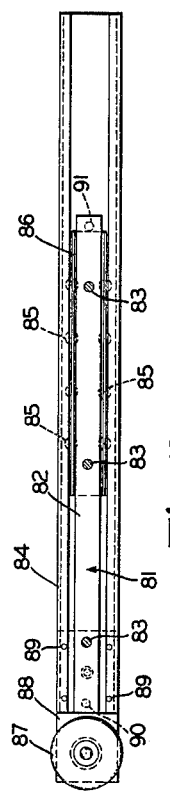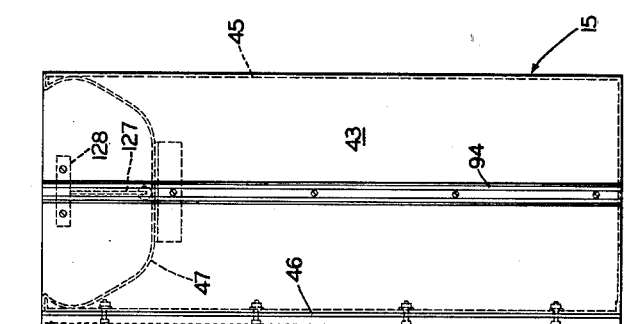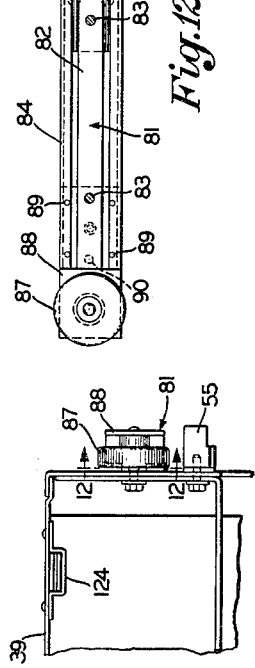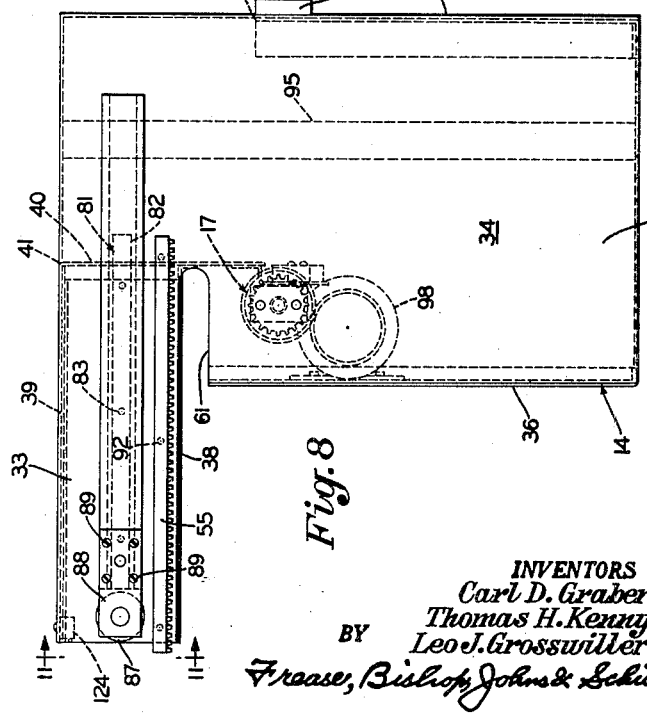

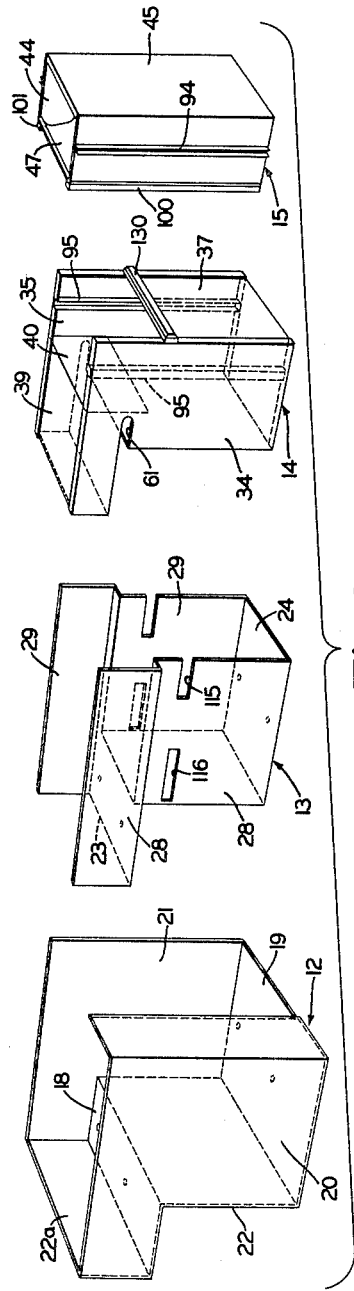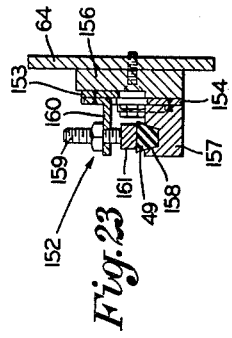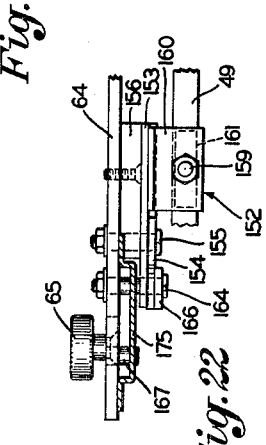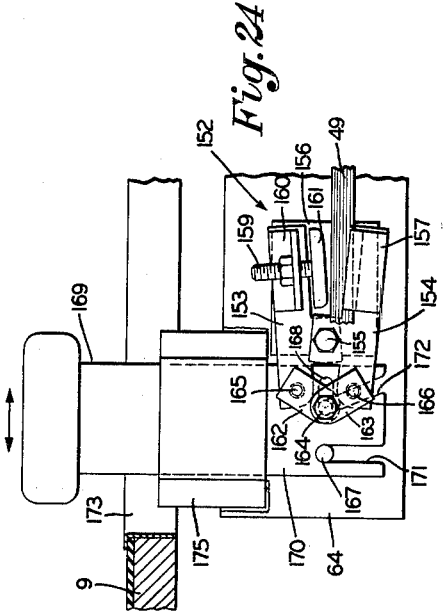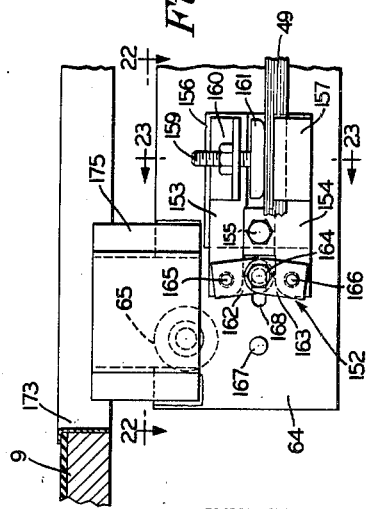

Oct. 23, 1962 C. D. GRABER ET AL 3,059,840
DEAL DRAWER CONSTRUCTION FOR BANK DRIVE-UP WINDOW
Filed March 21, 1961 9 Sheets-Sheet 9

INVENTORS
Carl D. Graber
Thomas H. Kenny
BY Leo J. Grosswiller
Frease, Bishop, Johns & Schick
ATTORNEYS

United States Patent Office 3,059,840
Patented Oct. 23, 1962

3,059,840
DEAL DRAWER CONSTRUCTION FOR BANK DRIVE-UP WINDOW
Carl D. Graber, Orrville, Thomas H. Kenny, Navarre, and Leo J. Grosswiller, Louisville, Ohio, assignors to Diebold, Incorporated, Canton, Ohio, a corporation of Ohio
Filed Mar. 21, 1961, Ser. No. 97,335
6 Claims. (Cl. 232—44)

This invention relates to a drive-up service window. More particularly, it pertains to a deal drawer for a bank drive-up window, which drawer is readily adjustable to various horizontal and vertical positions to accommodate customers in vehicles of various heights.

Deal drawers have been used in the past for the purpose of passing articles, usually of high intrinsic value, such as money or securities, between persons on opposite sides of a wall. Such drawers have been particularly useful for the operation of institutions such as banks where depositors either walk or drive up to a cashier's window situated in a wall adjacent to a street or sidewalk.

Where the window is adapted for use with depositors who drive up to a window for making deposits, many prior constructions of drive-up windows have not been completely suitable for various reasons. The depositors who find it convenient to use the drive-up window service of a bank come from various types of endeavor. They drive different types of vehicles, such as trucks and automobiles of various sizes. As a result, it has been found that many of the prior deal drawer constructions have been either too high or too low. One prior deal drawer construction was provided which was dependent upon the drawer moving horizontally and vertically simultaneously and adjusting its height by the use of springs in response to the drawer contacting the outer surface of the depositor's vehicle. Such a deal drawer construction was unsatisfactory because many depositors objected to the frame of the drawer contacting the side of the vehicle even though the contact was made by a rubber bumper of one kind or another.

It has been found that an ideal deal drawer construction for a drive-up window for bank depositors should include means for moving the drawer not only vertically but horizontally by independent and separate means in response to controls manipulated by the operator of the drawer. By providing independent means for moving the drawer horizontally in and out of the drive-up window opening, as well as vertically in accordance with the height of the window of the vehicle of the depositor, a more satisfactory service could be rendered by a bank to its drive-up depositors. Also, the horizontal distance between the window and the vehicle varies with the driver-depositor.

The construction of the present invention provides a deal drawer which operates in four ways or directions to meet the desired level of the depositor in a vehicle of any size or height.

At the same time, the deal drawer of the present construction provides a unique structure from the standpoint of maintenance and service. The structure includes an inner stationary frame or housing which is detachably mounted within an outer housing to permit quick access to the inner operating parts whenever maintenance is necessary. Moreover, the combination of the various housings provides a plurality of walls which protect the operator or cashier of the deal drawer from any attack by attempted hold-up when a gun may be aimed through the opening in the drive-up window when the drawer is fully extended.

Another objection to drive-up windows of prior constructions has been their interference with the usable counter space. Inasmuch as the vertical height of the drawer in the extended position was seldom the same as the height of the drawer in the retracted position, prior constructions have been provided with a counter opening in which the deal drawer operates. Indeed, due to the peculiarities of structure of most prior deal drawer constructions, it has not been convenient to provide a continuous counter area for the operator. As a result, the center section of the usable counter space of most prior deal drawer constructions has been completely useless because of the necessity of providing an opening for movement of the deal drawer. Moreover, due to the particular structure and mode of operation of most prior deal drawer constructions, the height of the deal drawer in the retracted position varies in most cases according to its height in the extended position. In other words, the counter was necessarily provided with a center void in order to accommodate the movement of the deal drawer in the retracted position and in order to provide access to the drawer.

The deal drawer of the present invention overcomes that disadvantage of most prior deal drawer constructions by providing a deal drawer which in the retracted position is always disposed at the same level. As a result, the level may be selected which is within reach of the operator or teller. Moreover, by providing a single level the drawer and its entire operating structure may be disposed below the counter level, thereby providing additional usable counter space which was not heretofore available. A continuous horizontal work counter is provided which extends from one side to the other of the window area, which counter is disposed at a suitable height for an operator and at the same time provides a shield over the operating parts of the drawer to prevent articles such as paper from falling into and interfering with operation of the drawer.

Accordingly, it is a general object of this invention to provide a new and useful deal drawer construction for bank drive-up windows having independent means for manipulating the drawer vertically and horizontally with respect to a depositor.

It is another object of this invention to provide a deal drawer construction for a drive-up window which meets the level of a depositor in a vehicle of any height, thereby enabling the depositor to see into the drawer.

It is another object of this invention to provide a deal drawer construction having means for separately raising and lowering the drawer and for moving the drawer horizontally into and out of a retracted position within a drive-up window.

It is another object of this invention to provide a deal drawer construction for a bank drive-up window, which drawer includes separate electrical means for raising and lowering the drawer and for moving the drawer horizontally and which means are sufficiently interdependent to prevent jamming of the drawer when it is out of vertical alignment with the window opening.

Finally, it is an object of this invention to provide a deal drawer construction for a drive-up window which is mounted within a housing which is readily detachably mounted within an outer housing and is therefore conducive to expedient maintenance.

These and other objects and advantages, apparent to those skilled in the art from the following description and claims, may be obtained, the stated results achieved, and the described difficulties overcome, by the apparatus, constructions, arrangements, combinations, subcombinations, elements, parts, and principles, which comprise the present invention, the nature of which is set forth in the foregoing general statements, preferred embodiments of which—illustrative of the best modes in which applicants have contemplated applying the principles—are set forth in the following description and shown in the drawings, and which are particularly and distinctly pointed out and set forth in the appended claims forming part hereof.

The deal drawer construction of the present invention may be stated in general terms as being useful with a drive-up window of the type in a wall having outer and inner sides and having an opening in the wall below the window, the drawer construction including a stationary outer housing mounted under a teller's counter on the inner side of the window, an inner housing detachably mounted within the outer housing, a horizontally movable frame mounted within the inner housing, a vertically movable drawer mounted within the frame, means mounting the frame in the inner housing including a guide track and roller assembly between adjacent parts thereof, means mounting the drawer in the movable frame including guide tracks between adjacent walls thereof, the deal drawer being vertically movable between upper, lower, and central positions within the frame, the frame being movable between an extended position on the outer side of the wall and a retracted position within the wall, means for separately moving the frame horizontally and the drawer vertically including racks, gears, and electric motors, and said moving means also including limit switches for limiting horizontal and vertical movements of the drawer and frame in coordination with each other.

The preferred embodiment of the invention is illustrated by way of example in the accompanying drawings wherein:

FIG. 3 is an elevational view of the left side of the deal drawer which is mounted under the counter and within the outer wall of the drive-up window, and showing the drawer in the closed or retracted position;

FIG. 5 is a plan view of the open deal drawer taken on the line 5—5 of FIG. 4;

FIG. 6 is a horizontal sectional view taken on the line 6—6 of FIG. 3;

FIG. 8 is an elevational view of the movable frame of the deal drawer;

FIG. 9 is an elevational view of the drawer removed from the movable frame of FIG. 8;

FIG. 10 is a fragmentary vertical sectional view taken on the line 10—10 of FIG. 5;

FIG. 11 is an enlarged fragmentary end view taken on the line 11—11 of FIG. 8;

FIG. 12 is an elevational view of the guide track on which the movable frame is mounted, taken on the line 12—12 of FIG. 11;

FIG. 13 is a rear side view of the drawer showing the spaced racks;

FIG. 14 is an enlarged fragmentary view of one of the racks, taken on the line 14—14 of FIG. 6;

FIG. 15 is an enlarged horizontal sectional view taken on the line 15—15 of FIG. 14;

FIG. 16 is an enlarged horizontal sectional view taken on the line 16—16 of FIG. 14;

FIG. 19 is an enlarged perspective view of three of the limit switches included in the electric circuit;

FIG. 20 is an exploded view of the inner and outer housings, the movable frame, and the tray;

FIG. 21 is an enlarged elevational view of another belt-clamping means;

FIG. 22 is a plan view of the belt-clamping means, taken on the line 22—22 of FIG. 21;

FIG. 23 is a vertical sectional view of the belt-clamping means, taken on the line 23—23 of FIG. 21;

FIG. 24 is an elevational view of the belt-clamping means in the released position; and FIGS. 25 and 26 are wiring diagrams for the deal drawer.

Similar numerals refer to similar parts throughout the several views of the drawings.

Figure 1:
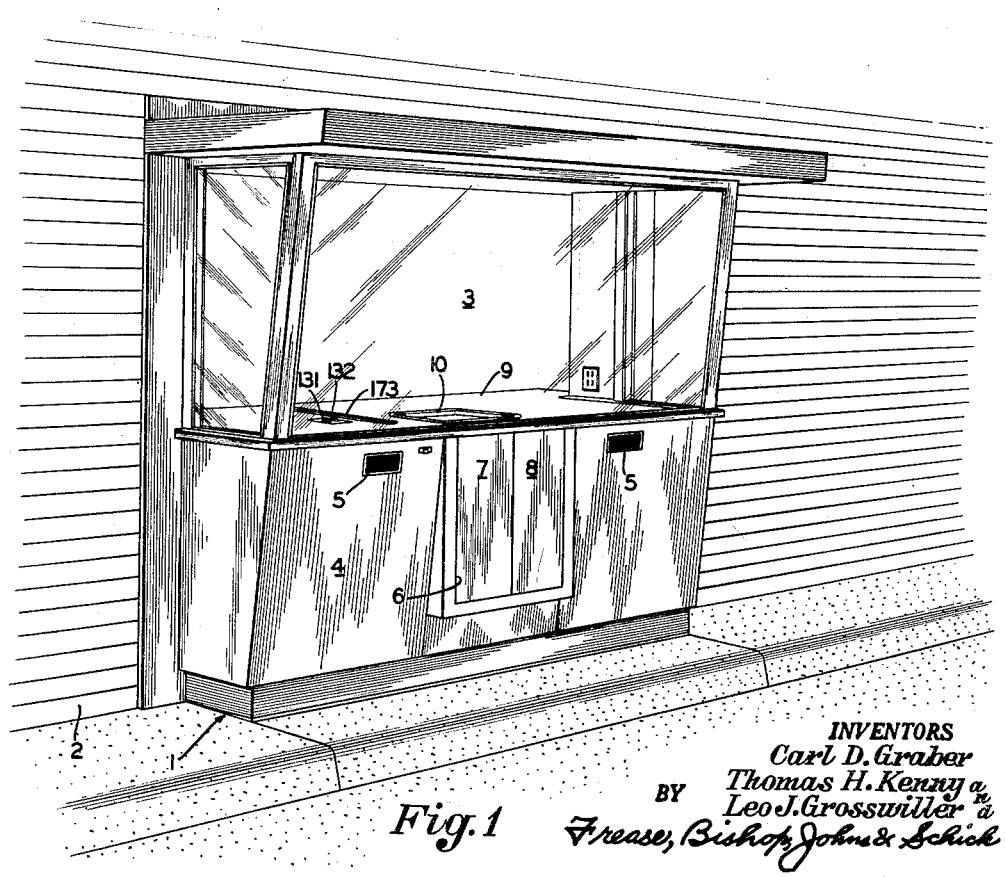
FIGURE 1 is a perspective view of a drive-up window installed in the wall of a building.

A drive-up window is generally indicated at 1 and is mounted in a wall 2 in a conventional manner. The window 1 includes upper and lower portions 3 and 4, the former of which is composed primarily of glass partitions and the lower portion of which is preferably composed of metal walls. If preferred, the upper portion 3 may be composed of bullet-proof glass to protect persons within the window 1. In addition, communication speakers 5 may be provided on the lower portion 4. As shown in FIG. 1, an opening 6 for a deal drawer is provided in the lower portion 4 of the drive-up window 1. A pair of the doors 7 and 8 are provided for closing the opening 6.

Within the driveup window 1 a work surface or counter 9 is provided having an opening 10 through which access may be had to a deal drawer assembly generally indicated at 11 which is situated below the counter as shown in FIG. 3.

The assembly 11 includes an outer housing or pod 12, an inner housing 13, a horizontally movable frame 14, and a vertically movable drawer or tray 15. The deal drawer assembly also includes means 16 for moving the frame horizontally into and out of the inner housing 13, and means 17 for moving the tray 15 vertically in the frame 14. As the frame 14 moves in and out through the opening 6, it automatically closes and opens the doors 7 and 8.

The outer housing or pod 12 is retained in place by frame members (not shown) which are secured to the wall 2 and the lower portion of the drive-in window 1. The outer housing 12 includes horizontal walls 18 and 19, spaced vertical walls 20 and 21, as well as a rear vertical wall 22 extending between the horizontal walls 18 and 19. A rear vertical wall 22a is detachably mounted between the upper ends of the walls 20 and 21. The front of the outer housing 12 is open to permit horizontal movement of the movable frame 14.

The inner housing 13, having a configuration substantially similar to that of the outer housing, includes horizontal walls 23 and 24 (FIG. 3) as well as a rear vertical wall 25, which walls are spaced from the outer housing walls 18, 19, and 22, respectively, by a clearance of approximately one-eighth of an inch. The inner housing is retained in place by two pairs of spaced screws 26 (between walls 19 and 24) and screws 27 (between the walls 18 and 23). In addition, the inner housing 13 includes spaced vertical walls 28 and 29 (FIG. 7) which define a front opening of the housing through which the movable frame 14 moves. The top side of the housing 13 is open and is provided with a spacer member 30 between the upper front corners of the vertical walls 28 and 29, as well as a spacer member 31 between the walls at the rear upper corners. The top side of the inner housing 13 is also open.

As shown in FIG. 8, the movable frame 14 includes a body portion 32 as well as an upper horizontal portion 33, which portions are defined by spaced vertical walls 34 and 35, a rear vertical wall 36, a front vertical wall 37, as well as a pair of horizontal walls 38 and 39. The lower end of the body portion is open. The upper horizontal wall 39 includes a downturned portion 40 which forms a corner 41 with said wall, leaving the forward top portion of the frame open. The front vertical wall 37 extends from the lower end of the body portion 34 and has an upper end 42 above which the front of the frame is open and joins the opening at the forward top portion of the frame. Moreover, the rear end of the upper horizontal portion 33 is open between the horizontal vertical walls 38 and 39.

The drawer 15 (FIG. 9) is a rectangular tubular member including spaced side walls 43 and 44 (FIG. 5) and front and rear vertical walls 45 and 46. The upper end of the drawer 15 is closed by a tray 47 composed of sheet metal and having an upturned U-shaped configuration extending between the side walls 43 and 44 and secured along opposite edges to the front and rear walls 45 and 46. The external dimensions of the drawer 15 are slightly less than the spacing between the vertical walls 34 and 35 and between the front wall 37 and downturned wall portion 40 so as to permit vertical movement of the drawer to and from the upper and lower positions of the drawer as shown in FIG. 4.

Figure 17:
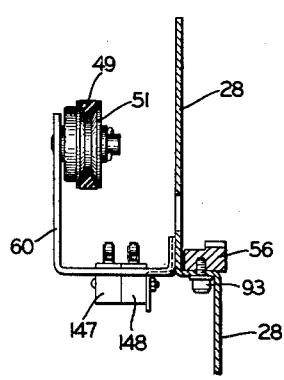
FIG. 17 is a vertical sectional view taken on the line 17—17 of FIG. 3.
Figure 18:
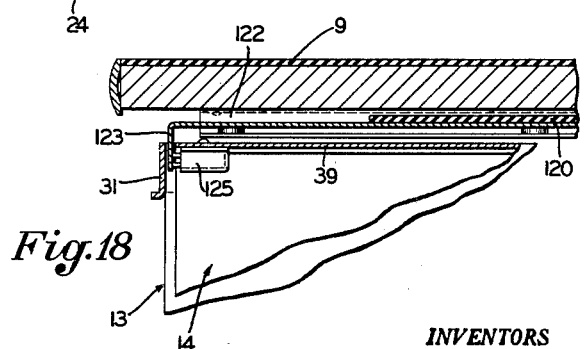
FIG. 18 is a fragmentary vertical sectional view taken on the line 18—18 of FIG. 7.

The means 16 for moving the frame 14 horizontally between the retracted position of FIG. 3 and the extended position of FIG. 5 include a reversible motor 48 (FIGS. 4 and 7), a V-belt 49 extending over and between pulleys 50 and 51, a shaft 52 having spaced spur gears 53 and 54, a spaced pair of gear racks 55 and 56, and a spaced pair of gear racks 57 and 58. The motor 48 is mounted on a bracket 59 extending from the wall 28 of the inner housing 13. As shown in FIG. 5, the pulley 50, driven by the motor 48, drives the continuous V-belt 49. The other end of the belt 49 is mounted on the pulley 51 that is supported by a bracket 60 (FIG. 17) which is attached to the wall 28.

Figure 7:
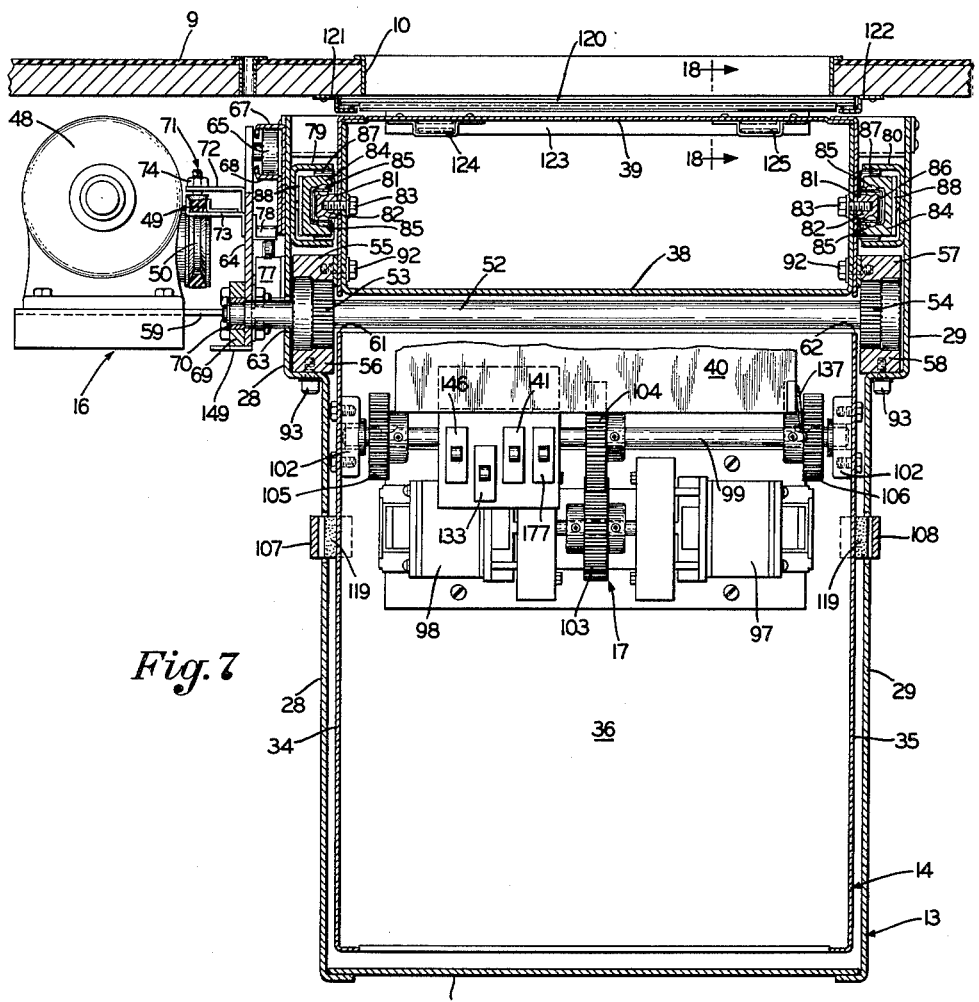
FIG. 7 is a vertical sectional view of the deal drawer taken on the line 7—7 of FIG. 3.

In FIG. 7 the shaft 52 extends across the movable frame 14 and through horizontal slots 61 and 62 in the walls 34 and 35, respectively. Slot 62 resembles slot 61 as shown in FIG. 8. In addition, the left end portion of the shaft 52 as shown in FIG. 7 extends through an elongated horizontal slot 63 in the upper portion of the wall 28 of the inner housing 13.

Figure 4:
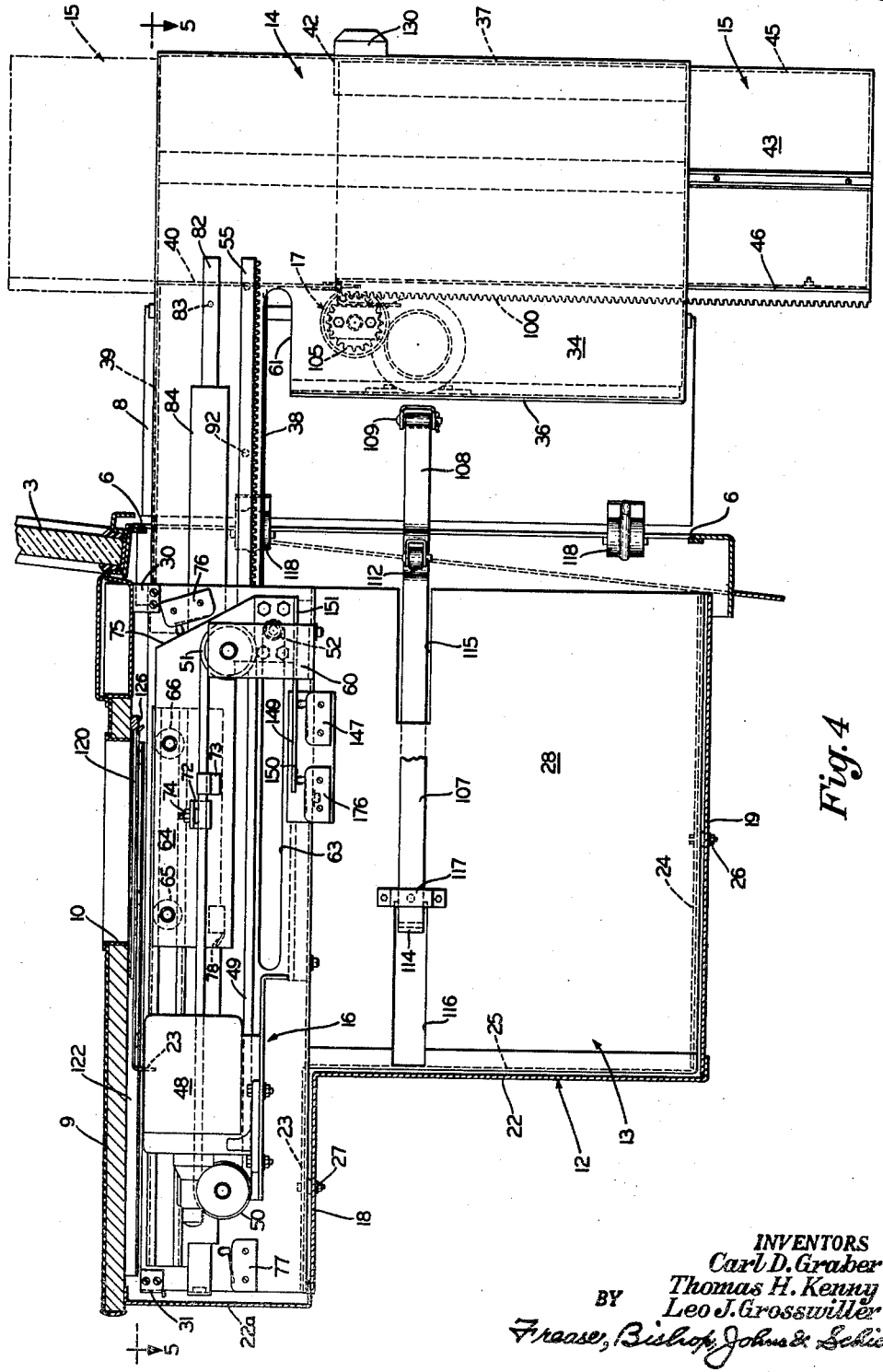
FIG. 4 is an elevational view of the deal drawer shown in FIG. 3, and showing the drawer in the open or extended position.

In FIGS. 3, 4, and 7, an actuator plate 64 is mounted vertically between the upper end of the wall 28 of the inner housing 13 and the motor 48. The plate 64 is horizontally movable with the horizontal movement of the frame 14 for which purpose it is provided with a pair of spaced rollers 65 and 66 that are mounted between oppositely disposed track members 67 and 68 attached to the wall 28. The lower end of the plate 64 is attached to the outer end of the shaft 52 by means of a bearing block 69 and a flange bearing 70 to permit the shaft 52 to rotate as the frame 14 travels horizontally.

Among other things, the plate 64 provides belt-clamping means 71 including upper and lower clamp brackets 72 and 73 for attachment to the belt 49. For that purpose a clamping nut and bolt assembly 74 is provided on the upper bracket 72. As shown in FIG. 7, the brackets 72 and 73 are secured to the plate 64. In addition, the plate 64 has an inclined front end 75 which at the forwardmost position of the plate, when the movable frame 14 is in the outermost position (FIG. 4), strikes an outer limit switch 76 to stop further operation of the motor 48. Moreover, a limit switch 77 is provided at the inner end of travel for the plate 64 (FIG. 3) for which a switch actuator 78 is provided on the side of the plate opposite that of the motor 48.

As shown in FIGS. 5 and 7, the movable frame 14 is mounted on a pair of horizontal tracks 79 and 80 which are channel members secured to the inner surfaces of the walls 28 and 29, respectively. Within each track 79 and 80 a bearing assembly 81 is provided on each wall 34 and 35, which assembly includes an elongated bearing cone 82 secured to the wall 34 or 35 by spaced bolts 83, a bearing race 84 which is an elongated channel member in which the cone 82 is seated, and spaced bearings 85 disposed between each cone and race. The ball bearings 85 are held in spaced relationship as shown in FIG. 12 by a channel-shaped spacer 86. In addition, at the inner end of each channel-shaped bearing race 84, a roller 87 is provided for engagement with the upper and lower sides of the U-shaped tracks 79 and 80 to prevent sagging of the frame 14 at its outermost position. Each roller 87 is secured to the inner end portion of each race 84 by a rectangular plate 88. Screws 89 are provided to secure the plate 88 and the race 84 together. Finally, at each end of each cone 82, stop pins 90 and 91 are provided to prevent the various parts of the bearing assembly 81 from becoming disengaged.

Horizontal movement is imparted to the frame 14 from the belt 49 through the clamp brackets 72 and 73 of the plate 64 and then to the shaft 52 from where it is transmitted through the spur gears 53 and 54 to the gear racks 55 and 57, respectively. As shown in FIG. 7, the gear racks 55 and 57 are secured to the walls 34 and 35, respectively, of the frame 14 by similar spaced bolts 92. As the spur gears are rotated in one direction or another, they travel over the lower gear racks 56 and 58 which are tacked to shoulder portions of the walls 28 and 29 of the inner housing 13 by similar bolts 93. As the spur gears roll along the lower stationary gear racks 56 and 58, they move the upper gear racks 55 and 57 inwardly or outwardly, depending upon the directional rotation of shaft 52. As was set forth above, the inner and outer limits of travel of the frame 14 are set by the position of the limit switches 76 and 77 (FIGS. 3 and 4).

During the horizontal travel of the frame 14 when the body portion 34 is within the opening 6, the drawer 15 is centrally located within the frame so that its upper and lower ends clear the opening 6 of the window. As soon as the body portion 34 of the frame 14 moves outwardly beyond the opening 6 of the window, the drawer 15 may be moved up or down to a position that is convenient to the depositor. As shown in FIGS. 6 and 9, the drawer 15 is provided with a pair of similar channel track members 94 at opposite sides thereof which are seated in similar channel track members 95 mounted on the inner side of the walls 34 and 35 of the frame 14. Ball bearings 96 are provided at spaced intervals between the interfitting track members 94 and 95 in a conventional manner.

The means 17 for moving the drawer 15 include a pair of reversible motors 97 and 98, a shaft 99, and a pair of gear racks 100 and 101. The motors 97 and 98 are mounted on the inner surface of the rear vertical wall 36. The shaft 99 is journally mounted at opposite ends between similar bearings 102 mounted on the inside of the walls 34 and 35. As shown in FIGS. 9 and 13, the gear racks 100 and 101 are mounted along opposite edges of the rear wall 46 of the drawer 17. Motion of the drawer is imparted from the motors 97 and 98 through interconnecting spur gears 103 and 104 through the shaft 99 to spur gears 105 and 106 engaging the gear racks 100 and 101, respectively. Thus the drawer 15 can be moved up or down by reversing the direction of rotation of the motors 97 and 98.

As shown in FIGS. 3, 5, and 6, the doors 7 and 8 are opened and closed automatically during the in and out movement of the frame 14 by means of a pair of links 107 and 108. Each link 107 and 108 is an elongated member bent to accommodate the inner housing 13 as well as the frame 14. The outer end of each link is pivotally mounted at 109 on a channel 110 secured on the inner surface of each door 107 and 108. From the pivot 109 each link extends inwardly and is provided with an outturned portion 111 on which a roller 112 is attached for roller engagement with the front wall 37 of the frame. A rear portion 113 of each link extends along the outer surface of each wall 28 and 29 and is provided with an inturned portion 114 which is disposed between the walls 25 and 36 of the inner housing 13 and the frame 14, respectively. As shown in FIGS. 3, 4, and 6, walls 28 and 29 are provided with similar elongated slots 115 through which outturned portions 111 of the links move during their operation. Likewise, each wall 28 and 29 is provided with a second elongated slot 116 aligned with the slots 115. The inner end portion 114 of each link moves through the slots 115 and 116 when opening and closing the doors 7 and 8. A strap 117 is provided on the outer surface of each wall 28 and 29 to hold the links 107 and 108 in place adjacent said walls.

Accordingly, as the frame 14 moves outwardly from the position of FIG. 3 to that of FIG. 4, the front wall 37 of the frame strikes the rollers 112 and thereby moves the links forwardly and outwardly to move the doors 7 and 8 from the closed position (solid line) to the open position (broken line) of FIG. 6. During the outward movement of the frame 14, the rollers 112 travel outwardly over the surface 37 and then rearwardly along the surfaces 34 and 35, as shown by the broken line positions of FIG. 6. Each door 7 and 8 is mounted on a pair of vertically spaced hinges 118 in a conventional manner.

On the other hand, when the frame 14 moves inwardly from the position of FIG. 4 to that of FIG. 3, the rear vertical wall 36 of the frame strikes the inturned end portions 114 having pads 119 thereon, and pushes the links 107 and 108 inwardly to the solid line positions of FIG. 6, whereby the doors 7 and 8 are closed.

At the same time when the frame 14 moves outwardly, it slides a cover 120 into position below the opening 10 of the counter 9. The cover 120 is a sheet metal member having opposite edges disposed under guide tracks 121 and 122 which are secured on opposite sides of the opening 10 on the undersurface of the counter, whereby opposite edges of the cover may slide back and forth with the frame 14. The rear end of the cover includes a downturned flange 123 (FIGS. 3, 4, and 7) which flange is composed of metal and is attracted by a pair of spaced magnets 124 and 125 (FIGS. 5 and 7) mounted at the rear end of the horizontal wall 39 of the frame 14. When the frame moves outwardly to the position of FIG. 4, the magnets 124 and 125 pull the cover 120 into position under the opening 10 until a front edge of the cover strikes a stop member 126. Therefore, when the frame returns to the retracted position of FIG. 3, the magnets strike the flange 123 and push the cover backwardly under the counter 9 from the opening 10 so that any contents in the tray 47 are accessible through the opening 10.

When the frame 14 is extended outwardly sufficiently to clear the opening 6 of the window 1, the drawer 15 may be raised or lowered as shown by the solid and broken line positions of the drawer in FIG. 4. With the drawer in the lowermost position, the upper end is aligned with the upper edge 42 of the front wall 37 where it is available to a user of the window, such as a bank depositor in a vehicle. In the lowermost position, the tray 47 is visible to a depositor who may be seated in a very low or small motor vehicle. For that purpose, therefore, the depositor may place articles into the tray 47 by reaching a hand into the opening above the upper end 42 of the wall 37 and between the spaced vertical walls 34 and 35. In the lowermost position, the upper ends of the gear racks 100 and 101 are disposed at the corresponding spur gears 105 and 106, as shown in FIG. 4.

On the other hand, when a depositor drives up in a higher vehicle, the deal drawer may be retained at its central position in the frame or raised to a higher position, as indicated by the broken lines of FIG. 4. Manipulation of the drawer 15 in either direction is separately controlled by the operator by switches in a manner to be described below. Horizontal movement of the frame 14 between the retracted and extended positions is likewise separately controlled by the operator.

In order to retain papers such as deposit books and money in the tray 47, a retainer 127 is provided which is composed of an elongated wire having opposite end portions pivotally mounted in blocks 128 and 129 on opposite walls 43 and 44 of the drawer 15, and having a central portion in contact with the lowermost surface of the tray 47.

As shown in FIG. 4, a bumper 130 composed of resilient material, such as rubber, may be mounted on the front vertical wall 37.

*Operation*

Figure 2:
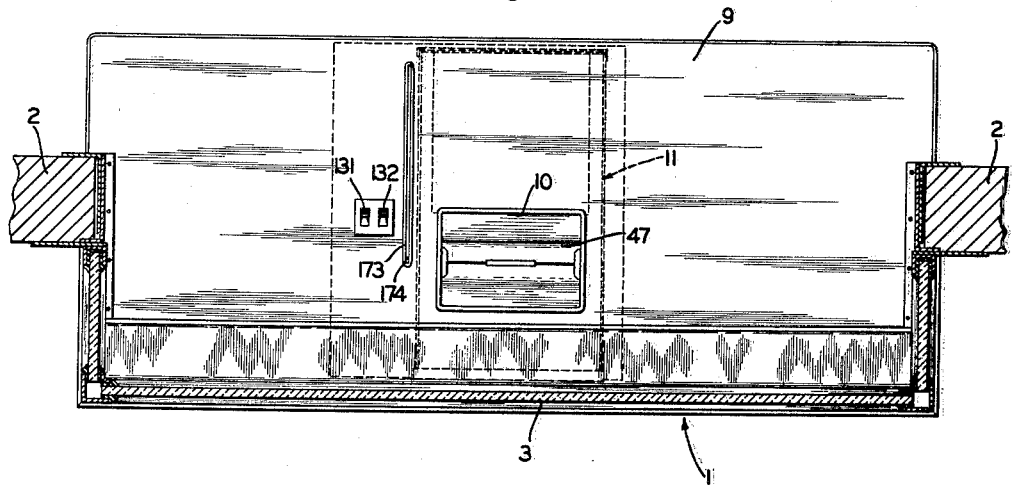
FIG. 2 is a plan view of a counter area within the outer glass wall of the window.

As shown in FIG. 2, a pair of manual switches 131 and 132 are provided on the counter adjacent the opening 10. Operation of the deal drawer assembly 11 begins by actuation of the "In-Out" switch 131 to the "Out" position. The switch 131 is a momentary switch at the "Out" position which causes the horizontal motor 48 to drive the frame 14 outwardly until either the switch 131 is released or the inclined front end 75 of the plate 64 strikes the limit switch 76 (FIG. 4), thereby opening the circuit through the motor. If the drawer 17 remains in the central or home position, the assembly 11 may be returned to the "In" or retracted position of FIG. 3 by pressing the "In" side of the switch 131 until the actuator plate 64 strikes the limit switch 77.

If, when the frame 14 is in the extended or "Out" position of FIG. 4, the drawer 15 is raised or lowered, it must be returned to the central or home position before the assembly can be entirely retracted to the "In" position of FIG. 3. For that purpose the means 17 for moving the drawer vertically is provided with additional limit switches. If the switch 132 is pressed to the "Down" position, the vertical motors 97 and 98 lower the drawer 15 until the momentary switch 132 is released or a normally closed limit switch 133 (FIGS. 6, 7, and 10) is contacted and opened by a down contact 134 which, as shown in FIGS. 10 and 13, is mounted on the upper portion of the wall 46. If the "In" switch 131 is actuated with the drawer 15 in the lower position, the "In" switch, being a double-throw switch, causes the frame 14 to return into the inner housing 13.

Simultaneously, the drawer 15 is moving upwardly to the central position within the frame due to an elongated sensing strip having two portions 135 and 136 extending along the inner side of the gear rack 101 (FIGS. 14 and 16). As shown in FIG. 14, a brush 137 engages one or the other of the sensing strips 135 and 136. A void 138 is provided between the upper and lower strips (FIGS. 14 and 15). When the drawer 15 is in a position below the home position so that the brush 137 contacts the upper sensing strip 135, the vertical motors 97 and 98 operate until the sensing strip 135 moves off the brush and onto the void 138, whereupon a coil 139 actuates relay contacts 140 to close the circuit through the motors 97 and 98.

When the drawer reaches the central position, a normally open switch 141 is contacted and closed by a switch contact 142 (FIG. 13) on the wall 46, whereby the drawer assembly 11 starts to return to the "In" or retracted position.

Likewise, if the drawer 15 is up with the frame 14 in the fully extended position, when the "In" button 131 is actuated, the brush 137, being in contact with the sensing strip 136, starts the drawer to lower by actuating the vertical motors 97 and 98 until the brush 137 moves off of the sensing strip and onto the void 138. A relay coil 143 is actuated for opening relay contacts 144. If the drawer is in the uppermost position, a switch contact 145 at the lower portion of the wall 46 (FIG. 13) engages and opens a circuit through a limit switch 146. Therefore, the vertical motors can only lower the drawer.

In addition to the foregoing, the means 16 for moving the frame 14 horizontally is provided with a pair of additional limit switches 147 and 148 which are mounted on the wall 28 of the inner housing and are actuated by a contact plate 149 having two striking edges 150 and 151 for separate engagement of the switches 147 and 148, respectively.

When the frame 14 is moving out from the retracted position of FIG. 3, the drawer 15 cannot be raised or lowered until the vertical wall 46 clears the opening 6 of the front of the drive-up window 1. However, as soon as the frame moves far enough out that the striking edge 150 of the contact plate 149 strikes and closes the limit switch 147, the vertical motors 97 and 98 can be actuated up or down according to the direction of throw of the switch 132. Likewise, when the frame moves in from the extended position of FIG. 4, the normally open switch 148 prevents the frame from retracting until the drawer 15 is in the neutral position. Accordingly, actuation of the "In" switch 131 causes the frame to return until the edge 151 of the plate 149 moves off of and opens the switch 148 to open the circuit through the horizontal motor. Thereafter the motor 48 will not be reactivated until the drawer 15 reaches the central position.

The foregoing operation may be altered to include an additional feature. As indicated above, the normal out travel of the frame 14 occurs by actuation of the "Out" button 131, causing the frame to move out automatically as long as the circuit is maintained closed through the button. With many installations, however, it is desirable that the drawer 15 move down approximately three inches as soon as the drawer rear wall 46 clears the front end of the frame 14, so that as the frame continues moving horizontally outwardly, the drawer moves down three inches automatically unless it is overridden by actuation of the "Up" button 132. With such an operation, the retracted position of the unit may be maintained at a more convenient level for the operator, and in the extended position the drawer is normally provided at a more convenient level for the operator of a vehicle driving up to the window.

The downward operation is accomplished by providing a limit switch 176 (FIGS. 3, 4, 5, and 19), which is normally open and is closed when the edge 151 of the plate 149 moves over the switch in a manner similar to the switch 148, as shown in FIG. 19. When the drawer moves down three inches, a limit switch 177 (FIGS. 6 and 7) is actuated by a contact 178 (FIG. 13) in order to open a circuit through the motor 48. Thereafter the frame continues its outward horizontal travel until the outer limit is reached.

Figure 26:
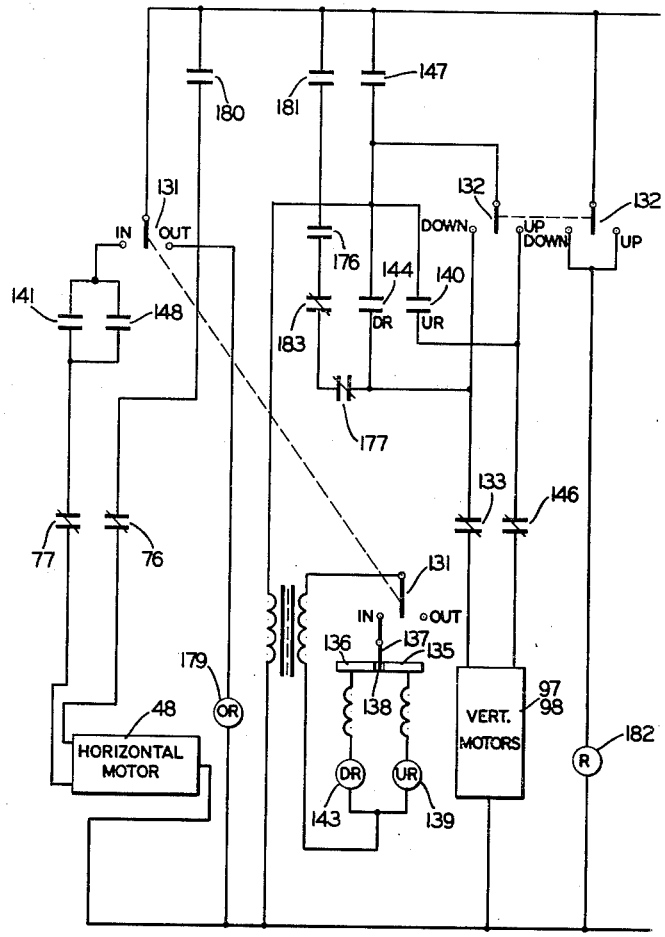

As shown more particularly in the circuit of FIG. 26, when the button 131 is actuated to the "Out" position, a relay coil 179 actuates contacts 180 for driving the horizontal motor 48, as well as relay contacts 181 for driving the vertical motors 97 and 98. Of course, the vertical motors will not operate until the normally open limit switch 176 is closed by the plate 149 (FIG. 19) as set forth above. After that, the drawer, having cleared the frame, moves down the indicated three inches until the limit switch 177 is opened, thereby opening the circuit through the motors 97 and 98.

On the other hand, if the operator desires to raise the drawer or to lower it farther than the automatic three inch limit, the button 132 is actuated and a relay coil 182 operates contacts 183 to open the circuit through the limit switches 176 and 177. Thus the motors 97 and 98 are free to raise or lower the drawer 15 and the automatic downward movement of the drawer during the transverse movement of the frame 14 is overridden.

The clamp means 71 including the brackets 72 and 73 suffice for securing the frame 14 to the belt 49 in order for the motor 48 to move the frame in and out. Where, however, the motor 48 or any other part of the components of the means 16 for moving the frame 14 fails to operate, the deal drawer assembly is rendered inoperative, even manually, until it can be repaired. Accordingly, it is expedient to provide manual means for moving the frame 14 in and out during a period of failure of any electrical component.

For that purpose an alternate clamp 152 may be provided as shown in FIGS. 21–24. It includes a pair of clamp levers 153 and 154 that are pivotally mounted on a pivot screw 155 extending from the plate 64. A spacer 156 is mounted between the plate 64 and the levers 153 and 164. As shown in FIGS. 21 and 23, a block 157 is mounted on the clamp lever 154, which block has a groove 158 having the shape of and adapted to receive the belt 49. Above the block 157 a clamping bolt 159 is mounted on a bracket 160 extending from the lever 153. A shoe 161 is secured to the lower end of the bolt 159 for pressing the belt 49 tightly in place.

The ends of the levers 153 and 154 remote from the block 157 and the bolt 159 are attached together by a toggle joint including a pair of links 162 and 163 which are interconnected by a pivot bolt 164 and which are pivotally secured at 165 and 166 to the levers 153 and 154, respectively. A pin 167 is mounted on the plate 64 and is spaced from the bolt 164 that extends into the plate through a horizontal slot 168. When the bolt 164 is moved toward the pin 167, the block 157 and the shoe 161 separate to release the belt 49. For that purpose a handle 169 is provided. It includes a blade 170 having a pair of slots 171 and 172 extending from one end thereof. One slot 171 extends longitudinally from the end of the blade and is seated on the pin 167. The other slot 172 is inclined and engages the bolt 164. When the slotted end of the blade 170 is pressed on the bolt 164 and the pin 167, the inclined slot 172 operates as a cam to move the bolt 164 to the left (as viewed in FIG. 24), thereby spreading the opposite ends of the clamp levers 153 and 154 and releasing the block 157 and the shoe 161 from clamping action on the belt 49.

As shown in FIG. 24, handle 169 is used to manually move the frame 14 in and out of the inner housing 13 when the electrical operating parts of the deal drawer 11 fail for one reason or another. The counter 9 is provided with an elongated slot 173 which is normally covering by a detachable strip 174. The blade 170 is inserted through the slot 173 and into a channel-shaped handle guide 175 which is secured, preferably by welding, into the plate 64 so that the plate and guide provide a socket for the blade, which socket is located directly above the bolt 164 and pin 167.

The foregoing device provides a deal drawer assembly which is ideal for all conditions in which deal drawers are used in combination with drive-up windows. Although the drawer is provided with a manual operating handle for use during emergencies, the drawer is normally operated electrically and is, therefore, completely automatic. At the same time, it is within complete control of the operator to the extent that it can be placed precisely in position either horizontally or vertically, depending upon the vertical position of a person on the outside of the window, which person may walk up or drive up to the window in a very low vehicle or a high vehicle such as a truck. The drawer may be adjusted vertically or horizontally to whatever location is most convenient for the person on the outside of the window.

The drawer is also separately movable vertically and horizontally with the adjustment in either direction being independent of the other rather than dependent upon each other as has been the condition in many prior deal drawer constructions. At the same time, the drawer assembly is provided with electrical means such as limit switches and motors which operate sequentially in response to manipulation by the operation of the control buttons. It is, therefore, impossible for an inexperienced operator to jam the operating mechanism and thereby render the drawer completely inoperative with the vertically movable portion in the extended position outside of the drive-up window.

Finally, the device provides a deal drawer which does not in any way interrupt the usable counter space or the convenient height of the deal drawer for the operator-teller, which disadvantages existed with most deal drawers of prior construction.

In the foregoing description certain terms have been used for brevity, clearness and understanding, but no unnecessary limitations have been implied therefrom as such words are used for descriptive purposes and are intended to be broadly construed.

Moreover, the embodiment of the improved construction illustrated and described herein is by way of example and the scope of the present invention is not limited to the exact construction shown.

Having now described the invention, construction, operation and use of a preferred embodiment thereof and the advantageous, new and useful results obtained thereby; the new and useful deal drawer construction for bank drive-up window and reasonable mechanical equivalents thereof obvious to those skilled in the art are set forth in the appended claims.

What is claimed is:

1. In a deal drawer construction for use with a drive-up window in a wall with outer and inner sides, having a teller's counter provided with a drawer-access opening spaced inwardly of the inner side of the wall, and having an opening in the wall below the counter; the combination therewith of
    (a) a stationary drawer frame mounted under the counter,
    (b) the frame having an opening adjacent to and aligned with the opening in the wall,
    (c) a boxlike frame mounted in the stationary frame and having opposite side walls and upper and lower ends,
    (d) a boxlike drawer mounted between the opposite side walls of the boxlike frame and having opposite side walls and a rear wall,
    (e) means for movably mounting the boxlike frame in the stationary frame including a horizontal guide track and roller assembly operatively mounted in clearance space between adjacent walls of the frames,
    (f) means for moving the boxlike frame horizontally between extended and retracted positions on the outer and inner sides of the wall opening and including a reversible motor and a gear and rack assembly with one rack horizontally mounted on at least one side of the boxlike frame,
    (g) means mounting the drawer between the opposite side walls of the boxlike frame including vertical guide tracks on at least one of the adjacent side walls of the drawer and frame in the clearance space therebetween.
    (h) means for moving the drawer vertically between upper, lower, and central positions on the guide tracks through the upper and lower open ends of the boxlike frame and including a reversible motor, a gear and rack assembly on and between adjacent walls of the drawer and boxlike frame,
    (i) the drawer in the central position having upper and lower ends contained between the upper and lower ends of the boxlike frame,
    (j) the boxlike frame being movable between the extended and retracted positions through the wall opening only with the drawer disposed in the central position,
    (k) The boxlike frame being movable horizontally between the partially and completely extended positions with the rear wall of the drawer being outside of the wall opening,
    (l) the drawer being movable vertically at any extended position of the boxlike frame between partially and completely extended positions, and
    (m) control means connected to the reversible motors for independently raising and lovering the drawer between upper, lower, and central positions, for independently moving the boxlike frame inwardly and outwardly through the wall opening, and for simultaneously moving the drawer vertically in the frame horizontally when the frame is moving horizontally between partially and completely extended positions in either direction.

2. The device set forth in claim 1 in which the drawer may be moved vertically when the boxlike frame is only partially extended with the inner side of the drawer outside of the wall opening.

3. The construction set forth in claim 1 in which the guide tracks for the drawer include a channel track on one of the facing surfaces of the spaced end walls of the drawer and frame and guide track engaging means on the other of said surfaces and in which similar channel tracks are provided on opposite ends of the drawer.

4. The construction of claim 3 in which the means for moving the drawer vertically include a vertical rack mounted on the rear wall of the drawer and a motor operated pinion engaging the rack and mounted on the boxlike frame.

5. The construction set forth in claim 1 in which the horizontal guide track and roller assembly for the boxlike frame includes at opposite side walls of the frame a channel track mounted on one of the facing surfaces of the boxlike frame and the stationary frame and track engaging rollers on the other of said surfaces.

6. The construction as set forth in claim 1 in which the reversible motor, gear and track assembly for moving the boxlike frame horizontally includes a first horizontal rack on opposite side walls of the boxlike frame, a second horizontal rack mounted on the side wall of the stationary frame, which second rack faces the first corresponding rack, and in which a pinion gear is mounted between each pair of first and second racks on opposite sides of the boxlike frame, and in which both gears are fixedly mounted on a shaft.

References Cited in the file of this patent

UNITED STATES PATENTS

| | | |
|---|---|---|
| 2,215,978 | Schad | Sept. 24, 1940 |
| 2,722,179 | Belen | Nov. 1, 1955 |
| 2,914,244 | Wheeler | Nov. 24, 1959 |
| 2,949,870 | Graber | Aug. 23, 1960 |